(12) United States Patent
Bookbinder et al.

(10) Patent No.: US 9,908,803 B2
(45) Date of Patent: Mar. 6, 2018

(54) GLASS SHEETS WITH IMPROVED MECHANICAL STRENGTH

(71) Applicant: Corning Incorporated, Corning, NY (US)

(72) Inventors: Dana Craig Bookbinder, Corning, NY (US); Keith Leonard House, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/226,331

(22) Filed: Aug. 2, 2016

(65) Prior Publication Data

US 2016/0340221 A1 Nov. 24, 2016

Related U.S. Application Data

(63) Continuation of application No. 13/170,675, filed on Jun. 28, 2011, now Pat. No. 9,434,633.

(60) Provisional application No. 61/359,409, filed on Jun. 29, 2010.

(51) Int. Cl.
| | |
|---|---|
| *C03B 17/02* | (2006.01) |
| *C03B 17/06* | (2006.01) |
| *C03C 3/083* | (2006.01) |
| *C03C 3/091* | (2006.01) |
| *C03C 3/085* | (2006.01) |
| *C03C 3/087* | (2006.01) |
| *C03C 3/093* | (2006.01) |

(52) U.S. Cl.
CPC ............ *C03B 17/02* (2013.01); *C03B 17/064* (2013.01); *C03B 17/068* (2013.01); *C03C 3/083* (2013.01); *C03C 3/085* (2013.01); *C03C 3/087* (2013.01); *C03C 3/091* (2013.01); *C03C 3/093* (2013.01); *Y10T 428/2495* (2015.01)

(58) Field of Classification Search
USPC .................. 428/213, 220, 410, 427, 428
See application file for complete search history.

(56) References Cited

U.S. PATENT DOCUMENTS

| | | |
|---|---|---|
| 2,240,352 A | 4/1941 | Schmidt |
| 3,313,609 A | 4/1967 | Megles |
| 3,384,508 A | 5/1968 | Bopp et al. |

(Continued)

FOREIGN PATENT DOCUMENTS

| | | |
|---|---|---|
| CN | 101076447 | 11/2007 |
| CN | 101400613 | 1/2009 |

(Continued)

OTHER PUBLICATIONS

Nusca, Andrew; The science behind stronger display glass on your phone, computer; Dec. 21, 2009; SmartPlanet; whole document.*

(Continued)

*Primary Examiner* — Tahseen N Khan
(74) *Attorney, Agent, or Firm* — Michael A. Hood

(57) ABSTRACT

Transparent glass sheets having increased mechanical strength include an inner layer surrounded by surface compressive layers wherein the difference of the coefficient of thermal expansion of the inner layer and the surface compressive layer is greater than $50 \times 10^{-7}$ °C.$^{-1}$ and wherein the surface compressive layer has a compressive stress of at least about 300 MPa.

20 Claims, 3 Drawing Sheets

(56) References Cited

U.S. PATENT DOCUMENTS

| | | | |
|---|---|---|---|
| 3,445,316 | A | 5/1969 | Megles |
| 3,553,063 | A | 1/1971 | Megles |
| 3,649,440 | A | 3/1972 | Megles |
| 3,673,049 | A | 6/1972 | Giffen et al. |
| 3,737,294 | A | 6/1973 | Dumbaugh et al. |
| 3,746,526 | A | 7/1973 | Giffon et al. |
| 3,779,856 | A | 12/1973 | Pirooz |
| 3,790,260 | A | 2/1974 | Boyd et al. |
| 3,849,097 | A | 11/1974 | Giffen et al. |
| 3,931,438 | A | 1/1976 | Beall et al. |
| 3,958,052 | A | 5/1976 | Galusha et al. |
| 4,009,064 | A | 2/1977 | Andrews |
| 4,023,953 | A | 5/1977 | Megles et al. |
| 4,102,664 | A | 7/1978 | Dumbaugh |
| 4,204,027 | A | 5/1980 | Simon |
| 4,214,886 | A * | 7/1980 | Shay ............... C03B 17/02 65/121 |
| 4,340,645 | A | 7/1982 | O'Conor |
| 4,341,543 | A | 7/1982 | Andrus et al. |
| 4,391,914 | A | 7/1983 | Beall et al. |
| 4,424,146 | A | 1/1984 | Willis et al. |
| 4,425,146 | A * | 1/1984 | Izawa ............... C03C 15/00 65/17.4 |
| 4,486,213 | A * | 12/1984 | Lentz ............... C03B 17/02 156/294 |
| 4,726,981 | A | 2/1988 | Pierson et al. |
| 4,880,453 | A | 11/1989 | Coppola et al. |
| 5,084,328 | A | 1/1992 | Fine et al. |
| 5,190,807 | A | 3/1993 | Kimock |
| 5,342,426 | A | 8/1994 | Dumbaugh |
| 5,449,560 | A | 9/1995 | Antheunis et al. |
| 5,559,060 | A | 9/1996 | Dumbaugh |
| 5,610,572 | A * | 3/1997 | Yajima ............... H01C 1/032 338/22 R |
| 5,958,812 | A | 9/1999 | Koch et al. |
| 6,387,513 | B1 | 5/2002 | Beryle |
| 6,436,858 | B1 | 8/2002 | Laborde et al. |
| 7,153,798 | B2 | 12/2006 | Bordeaux |
| 7,201,965 | B2 | 4/2007 | Gulati et al. |
| 7,430,880 | B2 | 10/2008 | Butts et al. |
| 7,514,149 | B2 | 4/2009 | Bocko et al. |
| 7,524,784 | B2 | 4/2009 | Chacon et al. |
| 7,635,521 | B2 | 12/2009 | Aitken et al. |
| 7,666,511 | B2 | 2/2010 | Ellison et al. |
| 8,007,913 | B2 | 3/2011 | Coppola et al. |
| 8,053,079 | B2 | 11/2011 | Aoki |
| 8,075,999 | B2 | 12/2011 | Barefoot et al. |
| 8,211,505 | B2 | 7/2012 | Bocko et al. |
| 8,561,429 | B2 | 10/2013 | Douglas et al. |
| 9,206,009 | B2 | 12/2015 | Iwatsuki |
| 2005/0003136 | A1 | 1/2005 | Kurachi et al. |
| 2006/0127679 | A1* | 6/2006 | Gulati ............... B32B 17/06 428/426 |
| 2007/0190340 | A1 | 8/2007 | Coppola et al. |
| 2007/0293388 | A1 | 12/2007 | Zuyev |
| 2009/0197076 | A1 | 8/2009 | Xie et al. |
| 2009/0263662 | A1 | 10/2009 | Shelestak |
| 2010/0038014 | A1 | 2/2010 | Tomeno |
| 2010/0084016 | A1* | 4/2010 | Aitken ............... C03C 3/091 136/258 |
| 2010/0084106 | A1 | 4/2010 | Aitken et al. |
| 2010/0233407 | A1 | 9/2010 | Shelestak |
| 2011/0200804 | A1 | 8/2011 | Tomamoto et al. |
| 2011/0200805 | A1 | 8/2011 | Tomamoto et al. |
| 2011/0281093 | A1 | 11/2011 | Gulati et al. |
| 2011/0318555 | A1 | 12/2011 | Bookbinder et al. |

FOREIGN PATENT DOCUMENTS

| | | |
|---|---|---|
| JP | 2008056504 | 3/2008 |
| JP | 2008522950 | 7/2008 |
| JP | 2009084075 | 4/2009 |
| JP | 2009167025 | 7/2009 |
| JP | 201193728 A | 5/2011 |
| JP | 5448064 | 3/2014 |
| KR | 1020070087650 | 8/2007 |
| KR | 2008098059 | 6/2008 |
| KR | 1020167006975 | 4/2016 |
| WO | 2006065657 | 6/2006 |
| WO | 2007095114 | 8/2007 |

OTHER PUBLICATIONS

Price, James J.; A Mechanics Framework for Ion-Exchanged Cover Glass with a Deep Compression Layer; Dec. 2009; Corning; whole document.*
Bellman, Robert A.; The Chemical Durability of Eagle XG.TM in LCD Dry Etch Processes; Dec. 2007; SID Digest; 1514, 07, whole document.*
English Translation of Chinese Fifth Office Action CN201180032600.0 dated Mar. 3, 2017, Chinese Patent Office.
JP2015179348(A), Japanese Office Action dated Sep. 9, 2016, 6 Pgs.
European Office Action, dated Apr. 29, 2016, 1-4, European Patent Application No. 11731195.1-1375, European Patent Office, the Netherlands.
Notice on the Third Chinese Office Action, dated Feb. 15, 2016, pp. 1-5, Chinese Application No. 201180032600.0, the State Intellectual Property Office of the People's Republic of China, China.
Korean Office Action, dated Jun. 9, 2016, pp. 3-1-3-3, Korean Patent Application No. 10-2016-7006975, Korean Intellectual Property Office, Korea.
Corning Incorporated: "Gorilla Glass, technical information sheet", 2008, XP007919390, URL:http://www.corning.com/docs/specialtymaterials/pisheets/PI2317.pdf.
Corning Incorporated: "Eagle XG Glass, technical information sheet", 2006, XP007919391, URL:http://www.delta-technologies.com/downloads/Eagle%20XG.pdf.
Tandon, P., Effect of Stress on the Structural Relaxation Behavior of Glasses, J. Non-Crystalline Solids, vol. 351, Issues 27-29, 2210 (Aug. 15, 2005).
Scherer, G. W., "Thermal Stresses in Cylinder: Application to Optical Waveguide Blanks", J. Non-Crystalline Solids, 34, 223 (1979).
B. H. Kim, Y. Park, D. Y. Kim, U. C. Paek and W. T. Han, "Observation and Analysis of Residual Stress Development Resulting from OH Impurity in Optical Fibers", Optics Letters, vol. 27, Issue 10, 806 (2002).
Dumbaugh, W. H., J. E. Flannery and J. E. Megles, "Strong Composite Glasses", L 2258 MAN (1979).
Chinese office action, dated Nov. 24, 2014, pp. 1-7, Chinese Application No. 201180032600.0, the State Intellectual Property Office of the People's Republic of China.
Japanese office action, dated Jan. 23, 2014, pp. 1-3, Japanese Application No. 2013-518469, the Japan Patent Office.
Notification of Transmittal of the International Search Report and Written Opinion of the International Searching Authority, or the Declaration, dated Jun. 22, 2011 pp. 1-7, International Application No. PCT/US2011/041316, European Patent Office, the Netherlands.
Nusca, Andrew; The Science behind Stronger display glass on your phone, computer;Dec. 21, 2009; SmartPlanet; Whole document.
Price, James J; A Mechanics Framework for Ion-Exchanged Cover Glass with a deep Compression Layer;Dec. 2009; Corning; whole document.
Bellman, Robert A.; The Chemical Durability of Eagle XG.TM in LCD Dry Etch Processes;Dec. 2007; SID Digest; 1514, 07, whole document.
Taiwanese Office Action, dated May 19, 2015, pp. 1-5, Taiwan Application No. 100121720, Taiwan Intellectual Property Office, Taiwan.
Japanese Office Action, dated Jun. 16, 2015, pp. 1-4, Japanese Application No. 2013-518469, the Japan Patent Office, Japan.

* cited by examiner

GLASS SHEETS WITH IMPROVED MECHANICAL STRENGTH

CROSS-REFERENCE TO RELATED APPLICATIONS

This application is a continuation of U.S. application Ser. No. 13/170,675, filed on Jun. 28, 2011, which claims the benefit of, and priority to U.S. Provisional Patent Application No. 61/359,409 filed on Jun. 29, 2010 entitled, "Glass Sheets with Improved Mechanical Strength", the content of which is relied upon and incorporated herein by reference in its entirety.

BACKGROUND

The disclosure relates generally to glass sheets and more particularly to glass sheets having improved mechanical strength.

It has been long established that the mechanical strength of a glass article can be significantly increased if an outer surface of the glass is in compression. Strengthening of glass using adjacent glass layers having differences in their coefficient of thermal expansion (CTE) has also been studied.

In addition, it is known that the mechanical strength of a glass sheet can be substantially increased by using an ion exchange process. However, such processes can be limited by the amount of ion exchange that can be achieved depending on the composition and dimensions of the glass. In addition, such processes can significantly increase production costs and time, require substantial additional production floor space, and present waste disposal issues. Accordingly, it would be desirable to provide glass sheets with increased mechanical strength where an ion exchange process is not required in the production or processing of the glass.

SUMMARY

One embodiment of the disclosure relates to a transparent glass sheet that includes a surface compressive layer and an inner layer adjacent to the surface compressive layer. Between 0° C. and 300° C., the difference of the coefficient of thermal expansion of the inner layer and the surface compressive layer is greater than $50 \times 10^{-7}$ ° $C.^{-1}$ and the surface compressive layer has a compressive stress of at least about 300 MPa.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

We here present a method for making transparent glass sheets with compressive stress on the surface, where the amount of compressive stress and the thickness of the compressive layer can be readily dialed in glass sheets for a wide range of compositions, sizes and thicknesses.

As used herein, the term "transparent" is used to refer to a solid material in which at least 80% of the radiation in the visible spectrum that penetrates the material is transmitted through the material as opposed to being absorbed or scattered by the material. Particularly preferred transparent materials include those in which at least 95% of the radiation in the visible spectrum that penetrates the material is transmitted through the material as opposed to being absorbed or scattered by the material.

As used herein, the term "in situ crystallization process" refers to a process in which crystallizable formed glass is subjected to a heat treatment schedule in which the temperature of the glass is raised at a predetermined rate from a temperature at or below its annealing point to a temperature above its annealing point, held at a first temperature above its annealing point for a predetermined amount of time, and then lowered at a predetermined rate to a temperature below its annealing point such that percentage of the glass in a crystalline state is substantially higher following subjection to the heat treatment schedule.

As used herein, the term "ion exchange process" refers to a process in which formed heated glass is immersed in a heated solution containing ions having a larger ionic radius than ions that are present in the glass surface, wherein the smaller ions are replaced by the larger ones and the mechanical strength of the glass is increased.

As used herein, the term "essentially free of BaO" means that the glass contains less than about 0.1 mol % BaO.

Figure 1:
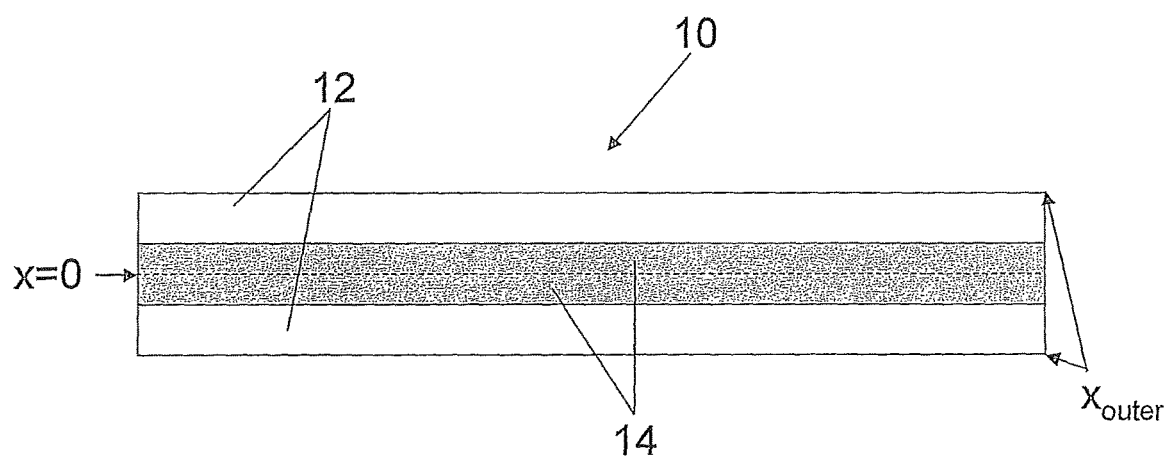
FIG. 1 illustrates a cross sectional view of a glass sheet as disclosed herein.

Transparent glass sheets as disclosed herein having compressive stress on the surface include transparent glass sheets comprising a surface compressive layer and an inner layer adjacent to the surface compressive layer. Such sheets can be fabricated using a fusion draw process wherein a surface compressive layer is drawn to the outside of an inner layer. FIG. 1 shows a cross-sectional view of a glass sheet 10 having surface compressive layers 12 surrounding inner layers 14, wherein the center of the cross-section of the glass sheet is indicated by x=0 and the outermost edges of the cross-section of the glass sheet are indicated by $x_{outer}$.

The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surface of the drawing tank. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes in contact with any part of the apparatus. Thus, the surface properties are not affected by such contact.

Figure 2:
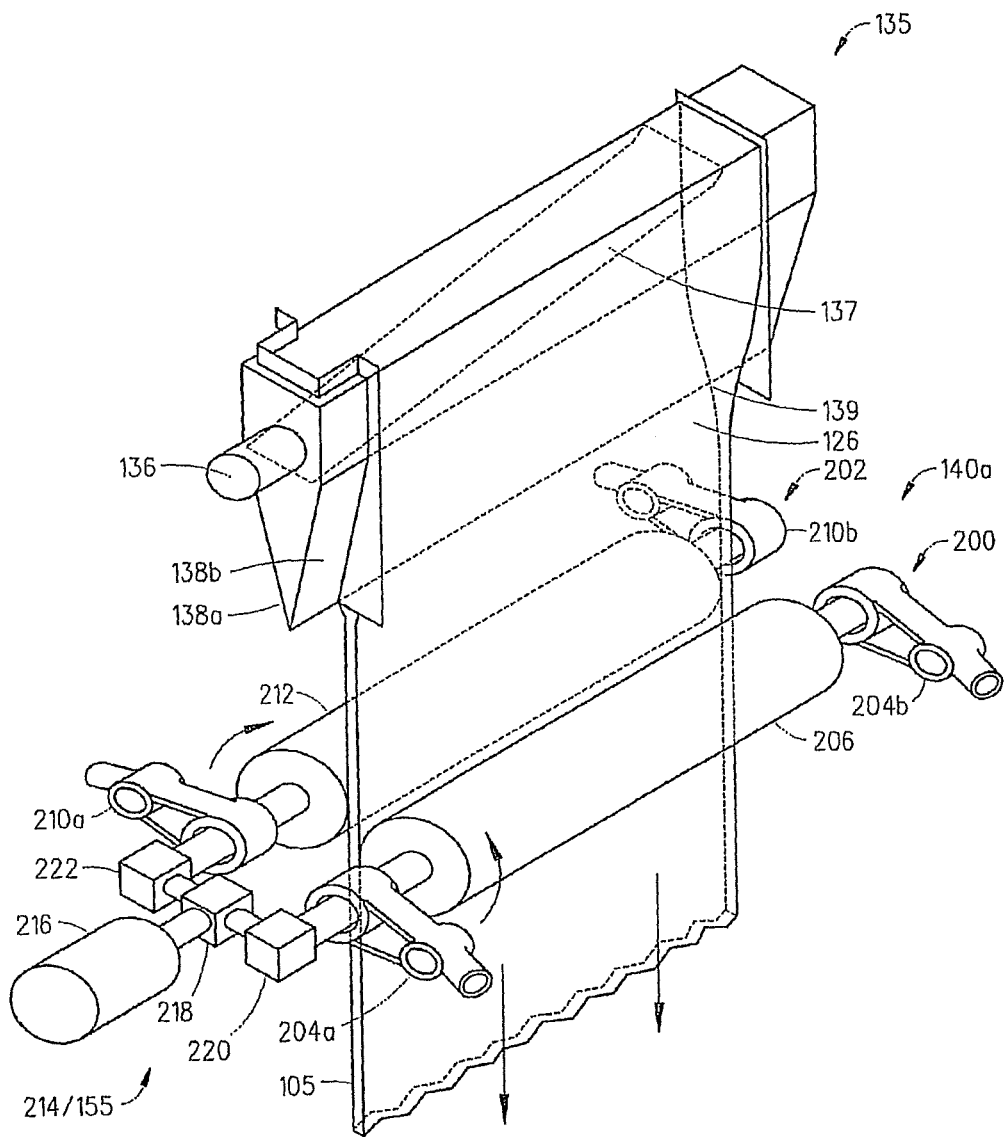
FIG. 2 illustrates a perspective view of a fusion draw apparatus that can be used to make single layered fusion drawn glass sheets.

FIG. 2 shows a perspective view of a fusion draw apparatus that can be used to make single layered fusion drawn glass sheets. Fusion draw apparatus includes a forming vessel 135 that includes an opening 136 that receives the molten glass 126 that flows into a trough 137 and then overflows and runs down two sides 138a and 138b before fusing together at what is known as a root 139. The root 139 is where the two sides 138a and 138b come together and where the two overflow walls of molten glass 126 rejoin (e.g., refuse) before being drawn downward by the pull roll assembly 140a to form the glass sheet 105. Pull roll assembly 140a includes a first roll assembly 200 and a second roll assembly 202. The first roll assembly 200 includes two pulling roll support arms 204a and 204b that support a first roll 206. Likewise, the second roll assembly 202 includes two pulling roll support arms 210a and 210b that support a second roll 212. The pull roll assembly 140a also incorporates a differential drive 214 (e.g., device 155) which includes a motor 216 (e.g., lhp motor 216) coupled to drive a differential axle 218 which in turn drives two 90° gear boxes 220 and 222. The first 90° gear box 220 interfaces with and drives the first roll 206. And, the second 90° gear box 222 interfaces with and drives the second roll 212.

Figure 3:
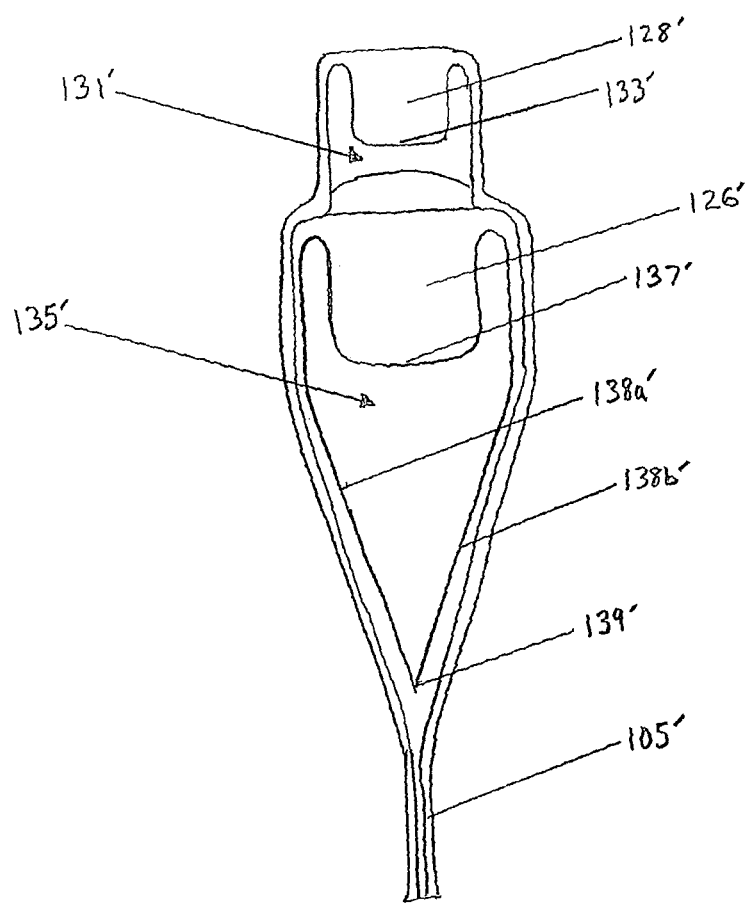
FIG. 3 illustrates a cross-sectional end view of a portion of a fusion draw apparatus having an upper forming vessel and a lower forming vessel that can be used to make embodiments disclosed herein.

Glass sheets as disclosed herein can be made by modifying the fusion draw apparatus shown in FIG. 2 to provide for transparent glass sheets having an inner layer surrounded by surface compressive layers. Specifically, the fusion draw apparatus shown in FIG. 2 can be modified to have a vessel that distributes the surface compressive layers and a vessel that distributes the inner layer to be surrounded by the surface compressive layers. A cross-sectional end view of a portion of such a fusion draw apparatus is illustrated in FIG. 3. Fusion draw apparatus includes an upper forming vessel 131' and a lower forming vessel 135'. Upper forming vessel 131' includes an opening (not shown) to receive molten glass 128' for surface compressive layers and lower forming vessel 135' includes an opening (not shown) to receive molten glass 126' for inner layer. Molten glass 126' flows into trough 137' and then overflows over two sides 138a' and 138b' before fusing together at root 139'. Molten glass 128' flows into trough 133' and then overflows over molten glass 126' to form glass sheet 105'. If additional glass layers are desired, fusion draw apparatus can be modified to include additional vessels to distribute the additional layers. In other respects, fusion draw apparatus can be similar to that illustrated in FIG. 2, including pull roll assembly 140a.

When drawing transparent glass sheets as disclosed herein, stresses can be induced during the draw process if the thermal and mechanical properties of the surface compressive layer and inner layer are different. Specifically, thermal and mechanical stresses can be induced during the draw process due to thermal and viscosity mismatch between the different layers. Compressive stress in the surface compressive layer can be obtained if the coefficient of thermal expansion (CTE) of the inner layer is greater than the CTE of the surface compressive layer, or if the viscosity of the inner layer is greater than the viscosity of the surface compressive layer.

In the case of the surface compressive layer and the inner layer having both CTE and viscosity mismatch, the total stresses are calculated by superposition of thermal (CTE mismatch) and mechanical (viscosity mismatch) stresses, i.e.

$$\sigma_z = \sigma_{z,th} + \sigma_{z,me} \quad (1)$$

For a two layered sheet, the thermal stresses at a given location can be calculated as:

$$\sigma_{z,th}(x) = \int_{T_{room}}^{T_{set}} \frac{E(x, T)}{1 - \upsilon(x, T)} [\alpha(x, T) - c(T)] dT \quad (2)$$

where $T_{set}$ is the setting temperature, $T_{room}$ is the room temperature, E is the Young's modulus, $\alpha$ is the coefficient of thermal expansion and v is the Poisson ratio.

The parameter c(T) is area averaged CTE and calculated as:

$$c(T) = \frac{1}{x_{outer}} \int_0^{x_{outer}} \alpha(x, T) dx \quad (3)$$

Different glasses in different layers of the sheet can also result in different regions having different viscosities and Young Modulus. The viscosity/ Young Modulus mismatch stress is estimated to be:

$$\sigma_{z,me} = \frac{2F}{A} \left[ \frac{\eta(x)}{\int_0^{x_{outer}} \eta(x) dx / x_{outer}} - \frac{E(x)}{\int_0^{x_{outer}} E(x) dx / x_{outer}} \right] \quad (4)$$

where F is the draw pulling force during draw, A is the sheet cross-section area ($A=2x_{outer}W$), $\eta$ and E are the viscosity and Young's modulus at location x.

Transparent glass sheets as disclosed herein have a surface compressive layer wherein the surface compressive layer has a compressive stress of at least about 300 MPa. By stating that the surface compressive layer has a compressive stress of at least 300 MPa, we mean that the surface compressive layer is in a state of compression, with the magnitude or absolute value of the compressive stress being at least 300 MPa. Compressive stress values can be determined using photoelastic measurements using a polarimeter as defined in ASTM F218 "Standard Method for Analyzing Stress in Glass", the entire disclosure of which is incorporated herein by reference.

The coefficient of thermal expansion (CTE), when referenced herein, is the average CTE of a given material or layer between 0° C. and 300° C.

The softening point of a glass layer or region is defined as the temperature at which the viscosity of the glass in the temperature or region is equal to about $10^{7.6}$ poise (i.e., $3.981 \times 10^7$ poise). The softening point of the glass and viscosity of the glass at temperatures near the softening point can be determined using ASTM C338-93 (2008) "Standard Test Method for Softening Point of Glass", the entire disclosure of which is incorporated herein by reference.

The CTE difference of the inner layer and the surface compressive layer of glass sheets as disclosed herein is greater than $50 \times 10^{-7}$ °C.$^{-1}$, such as greater than $75 \times 10^{-7}$ °C.$^{-1}$, and further such as greater than $90 \times 10^{-7}$ °C.$^{-1}$, including between $50 \times 10^{-7}$ °C.$^{-1}$ and $100 \times 10^{-7}$ °C.$^{-1}$, and further including between $75 \times 10^{-7}$ °C.$^{-1}$ and $100 \times 10^{-7}$ °C.$^{-1}$, wherein the CTE of the inner layer is greater than the CTE of the surface compressive layer. The CTE ratio of the inner layer to the surface compressive layer is preferably greater than 2.5, such as greater than 3, and further such as greater than 3.5, and even further such as greater than 4, including between 2.5 and 5, such as between 3 and 5. In one set of exemplary preferred embodiments, the CTE of the surface compressive layer ranges from about $25 \times 10^{-7\circ}$ C.$^{-1}$ to about $35 \times 10^{-7\circ}$ C.$^{-1}$ and the CTE of the inner layer ranges from about $75 \times 10^{-7\circ}$ C.$^{-1}$ to about $125 \times 10^{-7\circ}$ C.$^{-1}$.

While embodiments disclosed herein include those in which the softening point of the surface compressive layer and the inner layer are at or near the same temperature or those in which the softening point of the surface compressive layer is above the softening point of the inner layer, in preferred embodiments, the softening point of the surface compressive layer is at least 40° C. below the softening point of the inner layer, such as at least 60° C. below the softening point of the inner layer, and further such as at least 80° C. below the softening point of the inner layer, still further such as at least 100° C. below the softening point of the inner layer, and yet still further such as at least 120° C. below the softening point of the inner layer. For example, in preferred embodiments, the difference in the softening point of the surface compressive layer and the softening point of the inner layer is between 40° C. and 150° C., such as between 60° C. and 150° C., and further such as between 80° C. and 150° C., and still further such as between 100° C. and 150° C. Preferably, the ratio of the viscosity of the surface compressive layer to the viscosity of the inner layer in the range of the softening point of the inner layer ±200° C. is from about 0.1 to about 0.9, such as from about 0.1 to about 0.5, and further such as from about 0.1 to about 0.3, and still further such as from about 0.1 to about 0.2.

The ratio of the thickness of the inner layer or layers to the total thickness of glass sheets as disclosed herein is preferably at least about 0.8, such as at least about 0.85, and further such as at least about 0.9, and still further such as at least about 0.95. While not limited to any particular thickness, glass sheets as disclosed herein preferably have a thickness ranging from about 0.3 mm to about 3 mm, such as from about 0.3 mm to about 1.5 mm.

Transparent glass sheets as disclosed herein are preferably drawn at a pulling force of at least about 5 pounds, such as at least about 25 pounds, and further such as at least about 50 pounds, and still further such as at least about 100 pounds, including from about 5 to about 250 pounds, such as from about 25 to about 200 pounds.

The CTE and viscosity properties of the surface compressive and inner layers as well as their relative thicknesses and force at which the glass sheet is drawn should be selected such that the surface compressive layer has a compressive stress of at least about 300 MPa, such as at least about 400 MPa, and further such as at least about 500 MPa, and still further such as at least about 600 MPa, and still yet further such as at least about 700 MPa, including from about 300 MPa to about 1000 MPa, such as from about 500 MPa to about 1000 MPa.

In one set of exemplary preferred embodiments, the surface compressive layer comprises an alkaline earth boro-aluminosilicate glass and the inner layer comprises an alkali aluminosilicate glass. The alkaline earth boro-aluminosilicate glass used in the surface compressive layer preferably has a CTE of from about $25 \times 10^{-7\circ}$ C.$^{-1}$ to about $35 \times 10^{-7\circ}$ C.$^{-1}$. The alkali aluminosilicate glass used in the inner layer preferably has a CTE of from about $75 \times 10^{-7\circ}$ C.$^{-1}$ to about $125 \times 10^{-7\circ}$ C.$^{-1}$.

The alkaline earth boro-aluminosilicate glass used in the surface compressive layer preferably comprises in weight percent on an oxide basis: (i) $65 \leq SiO_2 \leq 75\%$; (ii) $7 \leq Al_2O_3 \leq 13\%$; (iii) $5 \leq B_2O_3 \leq 15\%$; (iv) $5 \leq CaO \leq 15\%$; (v) $0 \leq BaO \leq 5\%$; (vi) $0 \leq MgO \leq 3\%$; and (vii) $0 \leq SrO \leq 5\%$. Preferably, the alkaline earth boro-aluminosilicate glass is essentially free of BaO. An example of an alkaline earth boro-aluminosilicate glass that can be used in the surface compressive layer is Eagle XG® Glass available from Corning Incorporated.

The alkali aluminosilicate glass used in the inner layer preferably comprises in weight percent on an oxide basis: (i) $50 \leq SiO_2 \leq 65\%$; (ii) $10 \leq Al_2O_3 \leq 20\%$; (iii) $0 \leq MgO \leq 5\%$; (iv) $10 \leq Na_2O \leq 20\%$; (iv) $0 \leq K_2O \leq 5\%$; and (v) $\leq 0$ and $\leq 1\%$ of at least one of $B_2O_3$, CaO, $ZrO_2$ and $Fe_2O_3$. An example of an alkali aluminosilicate glass that can be used in the inner layer is Gorilla® Glass available from Corning Incorporated.

The surface compressive layer and the inner layer can each optionally contain additional materials or dopants that further modify their CTE and/or viscosity properties.

In preferred embodiments of transparent glass sheets described herein, no layer of the transparent glass sheet has been subjected to an in situ crystallization process. Preferably, less than 10 ppm of any layer in the glass sheet is in a crystalline state, and more preferably less than 5 ppm of any layer in the glass sheet is in a crystalline state, and even more preferably less than 1 ppm of any layer in the glass sheet is in a crystalline state.

Preferably, no layer of the transparent glass sheet has been subjected to an ion exchange process.

To examine the effects of CTE (thermal stress), thickness ratio, and viscosity (mechanical stress) on compressive stress, a series of exemplary glass sheets were modeled having varying ratios of CTE and viscosity between the surface compressive layers and the inner layer as well as varying ratios between the thickness of the inner layer and the total thickness of the glass sheet. Each of the glass sheets reported in the tables below was modeled to have a thickness of 0.05 centimeters and a width of 35 centimeters and to be drawn at a pulling force of 50 pounds. The surface compressive layers of the glass sheet in each example were modeled to have a CTE of about $31.8 \times 10^{-7\circ}$ C.$^{-1}$ and a softening point of about 985° C. For each of the examples reported in the tables, the viscosity ratio of the inner layer to the surface compressive layer was based on the respective viscosities of these layers at a temperature at about the softening point of the surface compressive layer, specifically at about 985° C. at which temperature the viscosity of the surface compressive layer in each of the examples is about $3.981 \times 10^7$ poise.

Exemplary modeled glass sheets wherein, in each example, the CTE ratio of the inner layer to the surface compressive layer is about 3 (i.e., the CTE of the inner layer is about $95.4 \times 10^{-7\circ}$ C.$^{-1}$ such that the CTE difference between the inner layer and surface compressive layers is about $63.6 \times 10^{-7\circ}$ C.$^{-1}$) are set forth in Table 1.

TABLE 1

| Example No. | Viscosity ratio of surface compressive layer to inner layer | Thickness ratio of inner layer to total sheet thickness | Total compressive stress induced in surface compressive layer (MPa) |
| --- | --- | --- | --- |
| 1 | 1 | 0.6 | 343 |
| 2 | 1 | 0.8 | 457 |
| 3 | 1 | 0.9 | 514 |
| 4 | 1 | 0.95 | 542 |
| 5 | 0.5 | 0.6 | 344 |
| 6 | 0.5 | 0.8 | 457 |
| 7 | 0.5 | 0.9 | 514 |

TABLE 1-continued

| Example No. | Viscosity ratio of surface compressive layer to inner layer | Thickness ratio of inner layer to total sheet thickness | Total compressive stress induced in surface compressive layer (MPa) |
|---|---|---|---|
| 8 | 0.5 | 0.95 | 543 |
| 9 | 0.2 | 0.6 | 344 |
| 10 | 0.2 | 0.8 | 458 |
| 11 | 0.2 | 0.9 | 515 |
| 12 | 0.2 | 0.95 | 543 |
| 13 | 0.1 | 0.6 | 344 |
| 14 | 0.1 | 0.8 | 458 |
| 15 | 0.1 | 0.9 | 515 |
| 16 | 0.1 | 0.95 | 543 |

Exemplary modeled glass sheets wherein, in each example the CTE ratio of the inner layer to the surface compressive layer is about 4 (i.e., the CTE of the inner layer is about $127.2 \times 10^{-7}$ $C.^{-1}$ such that the CTE difference between the inner layer and surface compressive layers is about $95.4 \times 10^{-7}$ $C.^{-1}$) are set forth in Table 2.

TABLE 2

| Example No. | Viscosity ratio of surface compressive layer to inner layer | Thickness ratio of inner layer to total sheet thickness | Total compressive stress induced in surface compressive layer (MPa) |
|---|---|---|---|
| 17 | 1 | 0.4 | 345 |
| 18 | 1 | 0.6 | 515 |
| 19 | 1 | 0.8 | 685 |
| 20 | 1 | 0.9 | 770 |
| 21 | 1 | 0.95 | 813 |
| 22 | 0.5 | 0.4 | 345 |
| 23 | 0.5 | 0.6 | 516 |
| 24 | 0.5 | 0.8 | 686 |
| 25 | 0.5 | 0.9 | 771 |
| 26 | 0.5 | 0.95 | 814 |
| 27 | 0.2 | 0.4 | 346 |
| 28 | 0.2 | 0.6 | 516 |
| 29 | 0.2 | 0.8 | 686 |
| 30 | 0.2 | 0.9 | 771 |
| 31 | 0.2 | 0.95 | 814 |
| 32 | 0.1 | 0.4 | 346 |
| 33 | 0.1 | 0.6 | 516 |
| 34 | 0.1 | 0.8 | 686 |
| 35 | 0.1 | 0.9 | 771 |
| 36 | 0.1 | 0.95 | 814 |

By having a surface compressive layer that has a compressive stress of at least 300 MPa, transparent glass sheets disclosed herein can have improved mechanical properties, particularly increased mechanical strength without the need to be subjected to an ion exchange process.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A glass sheet comprising:
   an inner layer;
   a first surface compressive layer adjacent to the inner layer; and
   a second surface compressive layer adjacent to the inner layer;
   wherein each of the first surface compressive layer and the second surface compressive layer has a compressive stress of at least about 300 MPa; and
   wherein a ratio of a thickness of the inner layer to a thickness of the glass sheet is less than or equal to 0.9.

2. The glass sheet of claim 1, wherein a thickness of the first surface compressive layer is substantially equal to a thickness of the second surface compressive layer.

3. The glass sheet of claim 1, wherein between 0° C. and 300° C., a difference between a coefficient of thermal expansion of the inner layer and a coefficient of thermal expansion of each of the first surface compressive layer and the second surface compressive layer is greater than $50 \times 10^{-7}$ $C.^{-1}$.

4. The glass sheet of claim 1, wherein between 0° C. and 300° C. a difference between a coefficient of thermal expansion of the inner layer and a coefficient of thermal expansion of each of the first surface compressive layer and the second surface compressive layer is greater than $75 \times 10^{-7}$ $C.^{-1}$.

5. The glass sheet of claim 1, wherein between 0° C. and 300° C., a ratio of a coefficient of thermal expansion of the inner layer to a coefficient of thermal expansion of each of the first surface compressive layer and the second surface compressive layer is greater than 2.5.

6. The glass sheet of claim 1, wherein between 0° C. and 300° C., a ratio of a coefficient of thermal expansion of the inner layer to a coefficient of thermal expansion of each of the first surface compressive layer and the second surface compressive layer is greater than 3.

7. The glass sheet of claim 1, wherein a thickness of the glass sheet is about 0.3 mm to about 3 mm.

8. The glass sheet of claim 1, wherein a ratio of a viscosity of each of the first surface compressive layer and the second surface compressive layer to a viscosity of the inner layer in a range of the softening point of the inner layer ±200° C. is from about 0.1 to about 0.9.

9. The glass sheet of claim 1, wherein each of the first surface compressive layer and the second surface compressive layer has a compressive stress of at least about 500 MPa.

10. The glass sheet of claim 1, wherein no layer of the glass sheet has been subjected to an in situ crystallization process.

11. The glass sheet of claim 1, wherein less than 10 ppm of any layer of the glass sheet is in a crystalline state.

12. The glass sheet of claim 1, wherein no layer of the glass sheet has been subjected to an ion exchange process.

13. The glass sheet of claim 1, wherein the glass sheet is transparent.

14. The glass sheet of claim 1, wherein the compressive layer comprises a first compressive layer and a second compressive layer of substantially equal thicknesses, each fused to the inner layer.

15. The glass sheet of claim 1, wherein a softening point of each of the first surface compressive layer and the second surface compressive layer is less than a softening point of the inner layer.

16. The glass sheet of claim 15, wherein the softening point of each of the first surface compressive layer and the second surface compressive layer is at least 40° C. less than the softening point of the inner layer.

17. The glass sheet of claim 1, wherein:
- the inner layer comprises, in weight percent on an oxide basis: (i) 50≤SiO$_2$≤65%; (ii) 10≤Al$_2$O$_3$≤20%; (iii) 0≤MgO≤5%; (iv) 10≤Na$_2$O≤20%; (iv) 0≤K$_2$O≤5%; and (v) ≥0 and ≤1% of at least one of B$_2$O$_3$, CaO, ZrO$_2$ and Fe$_2$O$_3$; and
- each of the first surface compressive layer and the second surface compressive layer comprises, in weight percent on an oxide basis: (i) 65≤SiO$_2$≤75%; (ii) 7≤Al$_2$O$_3$≤13%; (iii) 5≤B$_2$O$_3$15%; (iv) 5≤CaO≤15%; (v) 0≤BaO ≤5%; (vi) 0≤MgO ≤3%; and (vii) 0≤SrO≤5%.

18. The glass sheet of claim 17, wherein each of the first surface compressive layer and the second surface compressive layer is essentially free of BaO.

19. A glass sheet comprising:
- an inner layer; and
- a compressive layer fused to the inner layer;
- wherein the compressive layer has a compressive stress of at least about 300 MPa; and
- wherein the inner layer has a tensile stress of at least about 29 MPa.

20. The glass sheet of claim 19, wherein between 0° C. and 300° C., a difference between a coefficient of thermal expansion of the inner layer and a coefficient of thermal expansion of the compressive layer is greater than $50 \times 10^{-7}$° C.$^{-1}$.

* * * * *

UNITED STATES PATENT AND TRADEMARK OFFICE
CERTIFICATE OF CORRECTION

PATENT NO. : 9,908,803 B2
APPLICATION NO. : 15/226331
DATED : March 6, 2018
INVENTOR(S) : Dana Craig Bookbinder et al.

Page 1 of 1

It is certified that error appears in the above-identified patent and that said Letters Patent is hereby corrected as shown below:

In the Claims

In Column 9, Line 10, Claim 17, delete "(iii) $5 \leq B_2O_3 15\%$;" and insert -- (iii) $5 \leq B_2O_3 \leq 15\%$; --, therefor.

Signed and Sealed this
Twenty-fourth Day of December, 2019

Andrei Iancu
*Director of the United States Patent and Trademark Office*